United States Patent [19]

Meo, III

[11] Patent Number: 5,360,067
[45] Date of Patent: Nov. 1, 1994

[54] VAPOR-EXTRACTION SYSTEM FOR REMOVING HYDROCARBONS FROM SOIL

[76] Inventor: Dominic Meo, III, 1807 Tradewinds La., Newport Beach, Calif. 92660

[21] Appl. No.: 64,592
[22] Filed: May 17, 1993
[51] Int. Cl.$^5$ ........................................... E21B 43/243
[52] U.S. Cl. ................................... 166/256; 166/260
[58] Field of Search ............... 166/251, 256, 258, 260, 166/267, 272

[56] References Cited

U.S. PATENT DOCUMENTS

| | | | |
|---|---|---|---|
| 260,803 | 7/1882 | Tichenor . | |
| 528,449 | 10/1894 | Staley . | |
| 825,745 | 7/1906 | Mitchell . | |
| 1,102,152 | 6/1914 | Jones . | |
| 1,272,625 | 7/1918 | Cooper . | |
| 1,286,666 | 12/1918 | Layne . | |
| 1,896,212 | 2/1933 | Woods . | |
| 2,104,327 | 1/1938 | Kotzebue . | |
| 2,157,085 | 5/1939 | Records . | |
| 2,180,400 | 11/1939 | Coberly . | |
| 2,423,653 | 7/1947 | Lauman . | |
| 2,718,263 | 9/1955 | Heilman et al. . | |
| 2,765,850 | 10/1956 | Allen . | |
| 3,019,838 | 2/1962 | Harlan et al. . | |
| 3,038,396 | 6/1962 | Jameson, Jr. et al. . | |
| 3,140,986 | 7/1964 | Hubbard . | |
| 3,221,812 | 12/1965 | Prats . | |
| 3,277,962 | 10/1966 | Flickinger et al. . | |
| 3,672,450 | 6/1972 | Bandyopadhyay | 166/260 |
| 3,705,851 | 12/1972 | Braner . | |
| 3,735,815 | 5/1973 | Myers | 166/313 |
| 3,743,355 | 7/1973 | Blackwell et al. | 299/12 |
| 3,765,483 | 10/1973 | Vencil | 166/265 |
| 3,881,551 | 5/1975 | Terry et al. | 166/272 |
| 4,017,120 | 4/1977 | Carlson et al. | 299/5 |
| 4,026,355 | 5/1977 | Johnson et al. | 166/246 |
| 4,059,156 | 11/1977 | Berg | 166/314 |
| 4,167,973 | 9/1979 | Forte et al. | 166/267 |
| 4,183,407 | 1/1980 | Knopik | 166/314 |
| 4,265,312 | 5/1981 | Thein | 166/312 |
| 4,278,502 | 7/1981 | Stevens et al. | 202/206 |
| 4,303,127 | 12/1981 | Freel et al. | 166/266 |
| 4,323,122 | 4/1982 | Knopik | 166/267 |
| 4,345,647 | 8/1982 | Carmichael | 166/66 |
| 4,366,846 | 1/1983 | Curati, Jr. | 141/1 |
| 4,369,839 | 1/1983 | Freeman et al. | 166/53 |
| 4,415,031 | 11/1983 | Hunt, III | 166/261 |
| 4,444,260 | 4/1984 | Boyd et al. | 166/267 |
| 4,457,374 | 7/1984 | Hoeksta et al. | 166/251 |
| 4,474,237 | 10/1984 | Shu | 166/261 |
| 4,593,760 | 6/1986 | Visser et al. | 166/267 |
| 4,660,639 | 4/1987 | Visser et al. | 166/267 |
| 4,730,672 | 3/1988 | Payne | 166/266 |
| 4,832,122 | 5/1989 | Corey et al. | 166/266 |
| 4,842,448 | 6/1989 | Koerner et al. | 405/258 |
| 4,886,119 | 12/1989 | Beahardt et al. | 166/267 |
| 4,890,673 | 1/1990 | Payne | 166/266 |
| 4,892,664 | 1/1990 | Miller | 210/747 |
| 4,901,796 | 2/1990 | Drnevich | 166/278 |
| 4,945,988 | 8/1990 | Payne et al. | 166/266 |
| 4,966,654 | 10/1990 | Carberry | 202/177 |
| 4,982,788 | 1/1991 | Donnelly | 166/266 |
| 5,018,576 | 5/1991 | Udell et al. | 166/272 |
| 5,050,676 | 9/1991 | Hess et al. | 166/267 |
| 5,050,677 | 9/1991 | Payne | 166/278 |
| 5,076,360 | 12/1991 | Morrow | 166/267 |
| 5,115,866 | 5/1992 | Corte et al. | 166/370 |

OTHER PUBLICATIONS

"Thermal Enhanced Soil Vapor Extraction"; Sittler et al; The National Environmental Journal; Jan. 1993.
"Electrical Heating and Plasma Based Destruction May Enhance Soil Vapor Extraction"; The Hazardous Waste Consultant; Mar. 1993.

Primary Examiner—William P. Neuder
Attorney, Agent, or Firm—Hawes & Fischer

[57] ABSTRACT

The invention is a closed-loop, thermal process for remediating soil contaminated with hydrocarbon chemicals; it is particularly well suited for the remediation of soils containing hydrocarbons with relatively high boiling points and for the remediation of soils which contain clays or silts. The process uses a combination of at least one extraction well which is used to withdraw vapors from contaminated soil and at least one injection well, called a "fire" well which is used to burn both a source of hydrocarbon fuel and all of the hydrocarbons present in the recovered vapors and then inject the combustion gases into contaminated soil. The heat in the combustion gases is used to raise the temperature of the contaminated soil and volatilize hydrocarbons in the soil. Dielectric heating can be used to supplement the heating performed by the combustion gases.

15 Claims, 1 Drawing Sheet

5,360,067

VAPOR-EXTRACTION SYSTEM FOR REMOVING HYDROCARBONS FROM SOIL

BACKGROUND OF THE INVENTION

1. Field of the Invention

This invention relates to a method for the removal of hydrocarbons from soil, particularly in raising the temperature of soil containing hazardous, volatile hydrocarbons to facilitate the removal of these hydrocarbons through vapor extraction. This method is particularly well suited for the removal of hydrocarbons with relatively high boiling points and for the removal of hydrocarbons from soil containing clay or fine silt.

2. Brief Statement of the Prior Art

The improper disposal of hydrocarbons and the leakage of hydrocarbons from underground storage tanks has resulted in contamination of the ground and groundwater beneath every city and town in the developed countries of the world. Many techniques have been developed to remediate soil and groundwater contaminated with hydrocarbons. Some techniques are limited to the remediation of soil only; others remediate both the soil and the underlaying groundwater.

"Vapor extraction" is a common method of environmental remediation; this method draws vapors containing volatile hydrocarbons from the soil. As these vapors are withdrawn from the soil, the quantity of hydrocarbons remaining in the soil and the underlaying groundwater is gradually reduced. When vapor extraction is conducted long enough, the quantity of hydrocarbons remaining in the soil and groundwater are reduced to a point which is considered non-threatening to the public health. When the vapors are drawn from the soil and exhausted into the atmosphere, with or without treatment, the method is called "open-loop". When the vapors are drawn from the soil, treated, and pumped back down into the soil, the method is called "closed-loop".

Because the vapors drawn from the soil often contain hazardous hydrocarbons, local, state, or federal environmental regulations may require that the vapors be treated to prevent air pollution. When the treatment equipment generates heat, and this heat is used to heat the treated vapors prior to injecting them back into ground, the process is called "closed-loop, thermally-enhanced vapor extraction". The heated vapors slowly raise the temperature of the contaminated soil, thereby enhancing the vaporization of the remaining hydrocarbons in the soil.

"Pump and treat" is a common method of remediating contaminated groundwater only; it uses a well to extract contaminated groundwater from the ground. The extracted groundwater is treated to remove the dissolved and floating hydrocarbons before being discharged to a local sewer or surface water.

The prior art can be conveniently divided into four groups: closed-loop technologies, both thermally-enhanced (thermal) and non-thermally-enhanced (non-thermal); and open-loop technologies, both thermal and non-thermal. Techniques in these categories have been developed to simultaneously treat both soil and groundwater, groundwater only, soil only, and free (hydrocarbon) product only. They are summarized as follows:

Soil and Groundwater

Technologies which simultaneously treat both soil and groundwater include: a closed-loop, non-thermal process disclosed in U.S. Pat. No. 4,966,564 and entitled "Soil and Groundwater Remediation System" which issued Oct. 30, 1990 to Carberry; an open-loop, thermal process disclosed in U.S. Pat. No. 5,018,576 entitled "Process for In Situ Decontamination of Subsurface Soil and Groundwater" issued on May 28, 1991 to Udell et al.; and an open-loop, non-thermal process disclosed in U.S. Pat. No. 5,050,676 entitled "Process for Two Phase Vacuum Extraction of Soil Contaminants" issued on Sep. 24, 1991 to by Hess et al., in U.S. Pat. No. 4,945,988 entitled "Apparatus and Process for Removing Volatile Contaminants From Below Ground Level" issued on Sep. 24, 1991 to Payne et al., and in U.S. Pat. No. 4,832,122 entitled "In-Situ Remediation System and Method for Contaminated Groundwater" issued on May 23, 1989 to Corey et al.

Groundwater Only

Technologies which treat groundwater only include an open-loop, non-thermal process disclosed in U.S. Pat. No. 6,892,664, entitled "Decontamination of Sites Where Organic Compound Contaminants Endanger the Water Supply" issued on Jan. 9, 1990 to Miller.

Soil Only

Technologies which treat soil only include: a closed-loop, thermal process disclosed in U.S. Pat. No. 4,982,788, entitled "Apparatus and Method for Removing Volatile Contaminants from the Ground" issued on Jan. 8, 1991 to Donnely; two closed-loop, non-thermal processes disclosed in U.S. Pat. No. 4,890,673, entitled "Method for Removing Volatile Contaminants from Contaminated Earth Strata" issued on Jan. 2, 1990 to Payne, and that disclosed in U.S. Pat. No. 4,730,672, entitled "Method of Removing and Controlling Volatile Contaminants from the Vadose Layer of Contaminated Earth" issued on Mar. 15, 1988 to Payne; and an open-loop, non-thermal process disclosed in U.S. Pat. No. 4,886,119, entitled "Method of and Arrangement for Driving Volatile Impurities from the Ground" on Dec. 12, 1989 to Bernhardt et al; in U.S. Pat. No. 4,842,448, entitled "Method of Removing Contaminants from Contaminated Soil In Situ" on Jun. 27, 1989 to Koerner et al., and in U.S. Pat. No. 4,660,639, entitled "Removal of Volatile Contaminants from the Vadose Zone of Contaminated Ground" on Apr. 28, 1987 to Visser et al.; and in U.S. Pat. No. 4,593,760, entitled "Removal of Volatile Contaminants from the Vadose Zone of Contaminated Ground" on Jun. 10, 1986 to Visser et al.

Free Product Only

Technologies which treat free product only include the open-loop, non-thermal process disclosed in U.S. Pat. No. 4,183,407, entitled "Exhaust system and Process for Removing Underground Contaminant Vapors" on Jan. 15, 1980 to Knopik.

Some of the above technologies use concepts found in processes developed to remove crude oil and other fuel hydrocarbons from the ground. These processes are summarized as follows:

Hydrocarbon Removal

Technologies which remove hydrocarbons from the ground include: closed-loop, thermal processes disclosed in U.S. Pat. No. 3,881,551, entitled "Method of Extracting Immobile Hydrocarbons" issued on May 6, 1975 to Terry et al. and disclosed in U.S. Pat. No.

4,303,127, entitled "Multistage Clean-Up of Product Gas from Underground Coal Gasification" issued on Dec. 1, 1981 to Freel et al.; and an open-loop, thermal process disclosed in U.S. Pat. No. 4,474,237, entitled "Method for Initiating an Oxygen Driven In-Situ Combustion Process" issued on Oct. 2, 1984 to Shu; and an open-loop, non-thermal process disclosed in U.S. Pat. No. 4,369,839, entitled "Casing Vacuum System" issued on Jan. 25, 1983 to Freeman et al. and disclosed in U.S. Pat. No. 4,345,647, entitled "Apparatus to Increase Oil Well Flow" issued on Aug. 24, 1982 to Carmichael.

Of the technologies cited above, six are closed-loop processes, of which three are thermal. Two of the three thermal technologies are used exclusively to recover hydrocarbon fuels; only one is used for environmental remediations. In the thermal process cited above is by Terry et al., it is not used for the environmental remediation of either soil or groundwater. Rather, it is used to extract a hydrocarbon fuel from deep beneath the earth. The process recirculates a heated fluid through a formation containing a solid hydrocarbon fuel. As the heated fluid passes through the formation, the solid fuel melts and flows through the formation to a well where it is pumped to the surface. The heat transfer medium is a liquid, not a gas.

In addition, there are fourteen open-loop processes, of which only two are thermal. Of the two thermal processes, one is used to recover hydrocarbon fuels, and one is used for environmental remediations.

Only two of the above processes, whether open or closed loop, are used for environmental remediation and employ heat. Donnelly employs a combination of heat from a heat pump and an independent electric coil to heat air drawn from contaminated soil before it is reinjected into the ground. Udell et al. simply injects live steam into the ground.

The technologies cited above which are used to recover hydrocarbon fuels employ heat by either circulating a heated fluid through the geological formation containing the fuel or by igniting the formation itself. Terry et al. circulates a heated fluid; Freel et. al. and Shu ignite the formation. Both are inefficient and are not effective for soil remediation.

In general, the above references fall short of the goals of performing adequate remediation for several reasons. For example, the non-thermal processes for remediating contaminated soil developed by Carberry, Morrow, Hess et al., Payne et al., Corey et al., Payne, Bernhardt et al., Koerner et al., and Visser et al. are generally limited to more volatile hydrocarbons such as those found in gasoline.

Although the processes developed by Udell et al. and Donnelly do heat the soil, they are substantially complex and quite expensive to operate. In the case of Udell et al., steam is injected into the ground where it condenses. The condensing steam heats the soil and volatilizes high-boiling hydrocarbons, but as the condensed steam migrates vertically through the soil, it leeches hydrocarbons out of the soil. When the condensed steam reaches the underlaying water table, it contaminates the groundwater. Special ground-water extraction wells are needed to extract and treat the contaminated groundwater from the ground. The cost of operating the steam boilers and extracting and treating the contaminated groundwater is very substantial. Further, none of the energy contained in the hydrocarbons removed from the soil is used to operate the process.

The process developed by Donnelly is also expensive to operate, and, again, none of the energy contained in the hydrocarbons removed from the soil is used to operate the process. The Donnelly process has the additional limitation of using a refrigerated coil to remove hydrocarbons from vapors drawn from the soil before these vapors are heated and reinjected back into the soil. Unless the refrigerated coil is operated in the cryogenic temperature range which would capture all of the hydrocarbons, which is unlikely due to the prohibitive cost, the vapors reinjected into the ground will contain significant amounts of hydrocarbons. Consequently, the Donnelly process actually recirculates hydrocarbons through the soil. This scheme limits the extent of remediation which can be achieved.

In a typical soil remediation, the soil is often a mixture of sand, silts, and clays which may be present in discrete layers, called lenses. When this soil is remediated using non-thermal vapor extraction, as demonstrated by the patents cited above, the hydrocarbons held by the silts and clays are very difficult to remove. Due to their high surface areas, clays and silts have a strong affinity for hydrocarbons and retard their volatilization.

SUMMARY OF THE INVENTION

The invention is a closed-loop, thermal process for remediating soil contaminated with volatile hydrocarbon chemicals. It is particularly well suited for the remediation of soils containing hydrocarbons with relatively high boiling points and for soils which contain clays or silts. The process uses a combination of at least one extraction well which is used to withdraw vapors from contaminated soil and at least one injection well, called a "fire" well which is used to burn all of the hydrocarbons present in the recovered vapors and then inject the combustion gases into areas in and about the contaminated soil. The heat in the combustion gases is used to raise the temperature of the contaminated soil and volatilize hydrocarbons in the soil.

In practice, fuel gas and air are introduced into the top of a burner located on top of a fire well where they are mixed and ignited to produce a flame; the flame projects downward from the burner into the fire well. A vacuum pump is used to draw hydrocarbon-bearing vapors from contaminated soil. These vapors are introduced into the flame section of the fire well beneath the burner, where they are ignited, producing additional heat. The ignited gases continue downward and exit at the bottom of the fire well through perforations provided for this purpose.

The combustion gases are pumped into the soil surrounding the fire well under positive pressure. The extraction wells surrounding the fire well are under negative pressure and help to draw the combustion gases through the soil. The combustion gases raise the temperature of the soil and cause the hydrocarbons contained in the soil to vaporize and flow toward the extraction wells.

In addition to providing a method for remediating soil containing hydrocarbons with relatively high boiling points, as described above, the present invention presented here provides a method for removing hydrocarbons which are adsorbed onto soils containing clays and silts. Dielectric heating can be used to supplement the heating performed by the combustion gases. In practice, the positive terminal of a direct-current power supply is attached to the metallic fire well. The negative terminal is attached to several conducting rods which are driven into the soil surrounding the fire well. As electrical current flows through the soil from the conducting rods to the fire well, the soil through which the current passes heats up.

Heating the soil permits remediating soil containing hydrocarbons with relatively high boiling points. The present invention is able to remediate soil containing hydrocarbons with much higher boiling points such as those found in diesel fuel.

By placing the openings of the fire well either in or below the clayey soil, the heat from the combustion gases exiting the fire well will spread laterally and vertically throughout the clayey soil. This effect is particularly noticeable when the hot combustion gases from the fire well are released into sandy soil below a clay lens. The hot combustion gases spread laterally through the sandy soil below the clay lens and heat a wide portion of the clay lens. As the clay is heated, volatile hydrocarbons held by the clay are slowly released.

The effect of dielectric heating is also more pronounced when remediating clay lenses. In a typical soil remediation, clay lenses will be separated by sandy soil. Due to their respective differences in surface area, the clay lenses often contain a higher concentration of hydrocarbons than the surrounding sand. Placing the conducting rods in the clay lenses, which hold more water than the surrounding sand, provides a preferential path through which the electrical current will flow. In this manner, the clay lenses are heated to a much greater extent than the sand for the surrounding sand. This is precisely the effect that is desired. The soil containing the higher concentration of hydrocarbons receives the most heat.

BRIEF DESCRIPTION OF THE DRAWING

The benefits and advantages of the present invention will be best shown with reference to the drawing of which Figure is a schematic diagram of the process shown with respect to a side sectional view of the ground layers in which remediation is to be performed.

DETAILED DESCRIPTION OF THE PREFERRED EMBODIMENT

Figure 1:
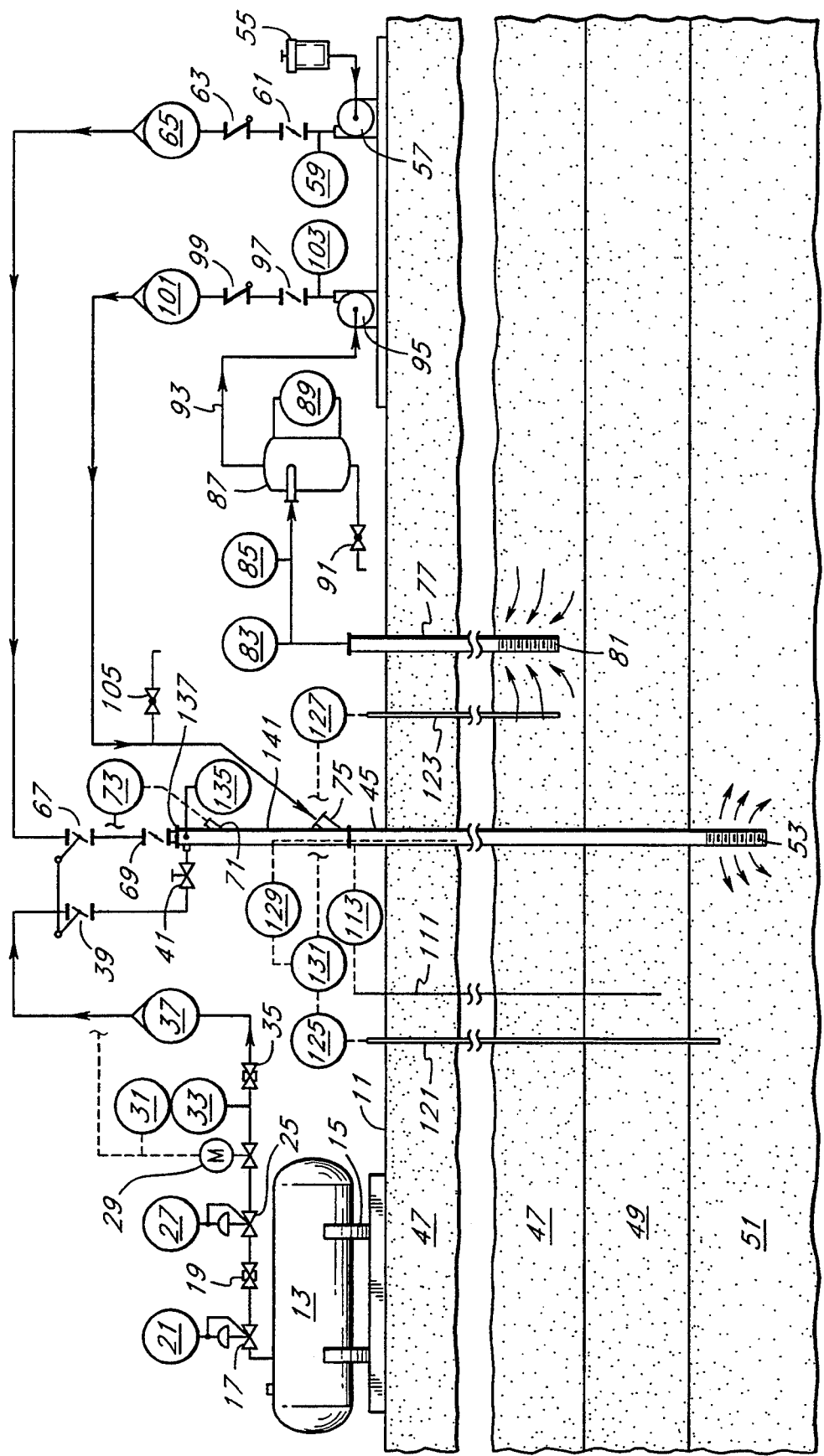

Referring to FIG. 1, the present invention employs two separate types of wells to remediate soil which is contaminated with hazardous volatile hydrocarbons. The structures will be first described for identification before a description of the operation. Beginning at the left side of the Figure, the above ground level is demarcated by a grade 11 line. Above grade 11, a propane gas storage tank 13 is supported. Tank 13, as well as other vessels and equipment of FIG. 1 may be truck mounted or skid mounted and may therefore have a common means of support to provide greater ease of operation an mobility.

The tank 13 is shown with grade 11 level mounting legs 15. Extending from the tank 13 is a propane gas supply line 17 connected to a valve 19. Valve 17 has a pressure tap leading to a pressure indicator 21. As is shown, pressure indicator 21 can be used to regulate valve 17. Valve 19 is connected to a valve 25. Valve 25 is connected to a valve 29. Valve 25 has a pressure tap leading to a pressure indicator 27. As is shown, pressure indicator 27 can be used to regulate valve 25. Valve 25 is connected to a motorized valve 29. Motorized valve 29 is controllably connected to pressure limit switch actuators 31 and 33. Pressure limit switch actuators 31 and 33 have a pressure tap connection to the other side of valve 29.

A valve 35 is also connected to valve 29. Valve 35 is connected to a flow indicator 37, which may be a visual flow indicator, either analog or digital. Valve 35 and flow indicator 37 are connected to a flow control valve 39. Flow control valve 39 is connected to a shutoff valve 41. The other side of shutoff valve 41 is in communication with the internal portion of a fire well 45.

Fire well 45 extends both above and below grade 11. Looking below the grade 11, and along the extent of fire well 45, it can be seen that fire well 45 is shown extending through a first sandy soil layer 47, a clay bearing soil layer 49 and into a second sandy soil layer 51. Fire well 45 is a continuous casing and may be made of metal in direct contact with the soil layers 47, 49, and 51. It is understood that multiple layers may be present, and that the fire well may extend through several layers of differing depth and several alternating layers of different types of material. At the lower extent of fire well 45, as it extends into layer 51, the fire well is fitted with a series of exit perforations 53. In the Figure, the exit perforations occur at the layer 51, and beneath the clay bearing layer 49.

Referring to the right side of the Figure, an air filter 55 is connected to the suction side of an air blower 57. The outlet of the blower is connected to a pressure indicator 59, flow control valve 61, check valve 63 and flow indicator 65. The check valve 63 is also connected to a flow control valve 67. The actuator of flow control valve 67 may be linked to the actuator of flow control valve 39 such that flow control valves 67 and 39 may be actuated in concert with each other. Flow control valve 67 is connected to one end of another flow control valve 69. The other end of flow control valve 69 is connected to the end of the fire well 45.

Fire well 45 also has a tap 71 leading to a flame (burner) sensing switch 73 which is used to control valve 29, along with inputs from pressure limit switch actuators 31 and 33. Fire well 45 also has a recirculation inlet 75, shown slightly above grade 11. Fire well 45 is also shown with a broken line along its length to illustrate the fact that it may be of any length. A series of arrows are shown at the lowermost portion of fire well 45, and adjacent the exit perforations 53, to indicate the flow of hot combustion products from the fire well 45.

To the right of the fire well 45 is a vapor-extraction well 77. Vapor-extraction well 77 similarly has a series of perforations, however these are inlet perforations 81. Typically, but not always, vapor-extraction well 77 may be shorter than fire well 45. The inlet perforations 81 are shown as being in a sandy soil layer 47, which is above the clay bearing layer 49. The vapor-extraction well 77 extends above grade 11 and communicates through a withdrawal port, shown in the Figure as being its upper end, with a pressure indicator 83, a temperature indicator 85, and a knockout pot 87.

Knockout pot 87 has a level gauge 89 and a drainage valve 91. An overhead line 93 connects the knockout pot 87 with the suction side of a vacuum pump 95. The outlet of vacuum pump 95 communicates with the recirculation inlet 75 of the fire well 45 through a series combination of a flow control valve 97, a check valve 99, and a flow indicator 101. Along this line of fluid communication there is a pressure indicator 103 located nearer the outlet of the vacuum pump 95 and a sample port 105 located nearer the recirculation inlet 75 of the fire well 45.

Also extending below grade 11 is one or more conducting rods 111. Conducting rod 111 may have any portion of their length exposed or insulated. For example, conducting rod 111 may have its lower length exposed and its upper length insulated. Conducting rod 111 is powered by either a direct-current or alternating-current power supply 113. The power supply 113 may also be connected, as is shown in the Figure, to the fire well 45. Alternatively, the power supply 113 may be connected to another conducting rod 111, to produce a voltage difference between several conducting rods 111 and the fire well 45, or to produce a voltage difference between one or more conducting rods 111 and another set of one or more conducting rods 111. In the configuration of the Figure, the conducting rod 111 is installed to pass current through the clay bearing soil layer 49, between the conducting rod 111 and the fire well 45.

The temperatures at various points in the configuration of the Figure may be measured to monitor the progress of the remediation activity. A first temperature probe rod 121 is inserted below grade and shown to the left of the conducting rod 111. The temperature probe rod 121 can have a temperature indicating device, such as a thermocouple or multiple thermocouples at any point or points along its length. For example, the temperature indicating elements could be arranged to allow measurements to be taken at each of the first sandy soil layer 47, clay bearing soil layer 49 and second sandy soil layer 51. The temperature probe rod 121 is configured to measure the temperature surrounding the fire well 45.

Another temperature probe rod 123 is configured to measure the temperature in the first sandy soil layer 47, between the fire well 45 and the vapor-extraction well 77. Other temperature probe rods similar to the temperature probe rods 121 and 123 may be employed. Temperature probe rod 121 is connected to temperature-sensing element 125 while temperature probe rod 123 is connected to temperature-sensing element 127. Another temperature-sensing element 129 is connected, as shown partially in dashed line format, to a temperature element (not shown) at some length within the fire well 45. The temperature-sensing elements 127, 125 and 129 are connected to temperature recorder 131, so that the process operating temperatures of the remediation process may be measured. In addition, a pressure indicator 135 is also attached to the upper end of fire well 45 to indicate the back pressure within the fire well 45.

The operation of the remediation device and process of the present invention is as follows. The process removes hydrocarbons from contaminated soil by injecting hot combustion gases directly from a gas burner (the details of which are not shown, but which will be referred to as burner 137), forming the upper section of the fire well 45, into soil located below grade 11. The burner 137 forms the upper section of the fire well 45, and the combustion gases exit at the base of the well through the exit perforations slots provided for this purpose. As the soil adjacent to the well, and particularly the second sandy soil layer 51 is heated, hydrocarbons, eventually within all of the first sandy soil layer 47, clay bearing soil layer 49, and second sandy soil layer 51 are volatilized and withdrawn from the soil through the vapor-extraction well 77. From the vapor-extraction well 77, the vapors pass through the knock out pot 87 where entrained water in these vapors is removed, and which may be periodically drained through drainage valve 91. The vacuum pump 95, which may be a blower similar to air blower 57, feeds these hydrocarbons into the recirculation inlet 75 where they are ignited, producing additional heat. The heat produced by burning these hydrocarbons accelerates the removal of more hydrocarbons from the soil, which in turn produces even more heat. The flow of hydrocarbon-bearing vapors directed into the fire well are measured with a flow indicator 101. The area adjacent the recirculation inlet 75 is kept hot enough to combust these hydrocarbons as they enter the fire well 45.

The air blower 57 is in communication with the air-inlet port of the burner 137, and the flow of air is measured with a flow indicator 65. The flow of propane and air is controlled with standard flow control valves 39 and 67 designed for this purpose. The propane and air are mixed inside the burner 137 and ignited to produce a flame; the flame projects downward from the burner 137 into the fire well 45. The ignited gases continue downward and exit at the bottom of the fire well 45 through exit perforations 53 provided for this purpose.

The hot combustion gases urged into the first sandy soil layer 51 spread out beneath the contaminated clay bearing soil layer 49, raising the temperature of the contaminated clay bearing soil layer 49. As the temperature of the contaminated clay bearing soil layer 49 is raised, hydrocarbons contained within this soil are volatilized and drawn toward the inlet perforations 81 of the vapor-extraction well 77.

In addition to using a hot gas to apply heat to the soil, the soil may be heated dielectrically. This is accomplished by passing a current through the soil from conducting rod 111 placed in the soil, below grade 11, and downwardly through the clay bearing soil layer 49, and to the casing of the metallic fire well. The amount of heat applied to the soil is proportional to the amount of current flowing through the soil.

The power supply 113 is shown connected to both the fire well 45 and conducting rod 111 such that the a weak electrical current is established between the conducting rod 111 and the fire well 45. When a direct-current (DC) power supply is used, the conducting rod 111 functions as the negative pole (cathode) of a DC circuit, and the fire well 45 functions as the positive pole (anode) of the circuit.

Heating the soil, including the first sandy soil layer 47, clay bearing soil layer 49, and second sandy soil layer 51, accomplishes at least two goals. First, relatively non-volatile hydrocarbons such as those found in diesel fuel are vaporized and removed from the soil. Conventional, non-thermal vapor extraction is generally limited to relatively volatile hydrocarbons such as those found in gasoline. Secondly, as the soil is heated, and the vapor pressure of the volatile hydrocarbons in the soil is increased, the time required to remediate the soil is reduced.

Temperatures are monitored using temperature-sensing elements: temperature element 125 is used to monitor the temperature of the first sandy soil layer 51 in proximity to the discharge of the fire well 45; temperature element 127 is used to monitor the temperature of the second sandy soil layer 57 in proximity to the inlet of the vapor-extraction well 77; and temperature element 129 is used to monitor the temperature in a flame section 141 of the fire well 45 which is generally shown as extending between recirculation inlet 75 and tap 71. These temperatures may be recorded continuously on the temperature recorder 131.

Pressures are monitored using pressure-sensing elements: pressure indicator 135 is used to measure the pressure at the top of the fire well 45; pressure indicator 83 is used to measure the vacuum at the top of the vapor-extraction well 77; pressure indicator 21 is used to measure the pressure in the propane storage tank 13; and pressure indicator 27 is used to measure the pressure of the propane supplied to the burner.

Progress in remediating the soil, including first sandy soil layer 47, clay bearing soil layer 49 and second sandy soil layer 51 may be monitored by periodically analyzing samples of the vapors drawn from below grade 11 through vapor-extraction well 77. Sample port 105 is used to collect these vapor samples. When the hydrocarbon concentration in these vapors has fallen below a critical level, the soil has been remediated.

Because the volatile hydrocarbons removed from the soil are generally hazardous, state and federal laws often prohibit their release into the atmosphere without treatment. Treating the hydrocarbon vapors drawn from the soil, however, raises the cost of vapor extraction. In addition, heating the soil also raises the cost of vapor extraction. The instant art accomplishes both treatment of the vapors withdrawn from the soil and heating of the soil in a very simple and cost-effective manner. Further, because there are no emissions to the atmosphere, an operating permit from an agency regulating atmospheric emissions is not even required. All of this is accomplished by using the vapors drawn from the soil as fuel for the fire well.

Donnelly, in the previously mentioned U.S. Pat. No. 4,982,788 attempts to employ the advantages of the present invention, yet falls short in several aspects. Although there are no emissions to the atmosphere, the heat recovered from the emission-control device, which is a simple refrigerated coil driven by a heat pump, is minimal. A secondary heat source, such as an electric heater, is needed to significantly raise the temperature of the soil. The cost of operating the electric heater is a drawback. Additionally, although a portion of the hydrocarbons extracted from the ground are recovered, the condensed liquid has little, if any value. The water vapor naturally present in the soil condenses with the hydrocarbons, forming a mixture of water and hydrocarbons. Such a mixture must often be discarded as a hazardous waste, further adding to the cost of the process. Finally, the concentration of hydrocarbons in the vapors extracted from the contaminated soil is typically less than 1,000 parts per million. Consequently, unless it is operated in the cryogenic range, the condensing coil used to remove hydrocarbons from the extracted vapor will operate inefficiently, and hydrocarbon vapors will be reinjected into the contaminated soil. In summary, at best, the Donnelly process does little to offset the cost of non-thermal vapor extraction, and at worst may be both ineffective and more expensive.

By comparison, the present invention has no waste products to dispose of, and the fuel value of the extracted hydrocarbons is utilized to help to power the process. It represents a clear advance over both the current art in conventional, non-thermal vapor extraction practiced by Payne, Bernhardt et al., Koerner et al., and Visser et al., and the current art in thermal vapor extraction, practiced by Donnelly. In comparison to the Shu process, virtually all of the vapors drawn from the extraction well employed by the present invention are reinjected back into the soil through an injection well containing a burner. Essentially all of the energy in the vapors drawn from the extraction well is used as fuel to operate the burner, unlike the Shu process which uses formation ignition surrounding the well sustained only by injecting an appropriate amount of oxygen into the formation.

While the present invention has been described in terms of a vapor extraction system for removing hydrocarbons from soil, one skilled in the art will realize that the structure and techniques of the present invention can be applied to many situations. The present invention may be applied in any situation where vaporous species need removal.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. A process for performing soil remediation comprising the steps of:
   burning a hydrocarbon fuel at a fire well at a first location to produce combustion gasses and injecting the combustion gasses below grade with said fire well;
   withdrawing gaseous vapors with an extraction well at a second location; and
   reinjecting said gaseous vapors into said fire well at said first location.

2. The process for performing soil remediation recited in claim 1 wherein said burning of a hydrocarbon fuel step further comprises the steps of:
   introducing a pressurized flow of a hydrocarbon fuel to a burner;
   introducing a pressurized flow of oxygen to said burner;
   combusting said hydrocarbon fuel with said oxygen to form combustion products; and
   introducing said combustion products into said fire well.

3. The process for performing soil remediation recited in claim 1 wherein said combustion products are produced at high pressure and where said introducing step is performed by placing the high pressure combustion products in communication with the fire well.

4. The process for performing soil remediation recited in claim 1 wherein said injection the combustion gasses step is performed by;
   flowing said combustion gasses through said fire well; and
   allowing said combustion gasses to exit said fire well through exit perforations in said fire well.

5. The process for performing soil remediation recited in claim 1 further comprising the step of removing water from said gaseous vapors before reinjecting said gaseous vapors into said fire well.

6. The process for performing soil remediation of claim 1 wherein said fire well extends to a first sandy soil layer beneath a clay bearing soil layer, and wherein said extraction well extracts said gaseous vapors from a point above said clay bearing soil layer.

7. The process for performing soil remediation as recited in claim 6 and further comprising the steps of passing a current through said clay bearing layer to heat said clay bearing layer to free additional gaseous vapors.

8. The process for performing soil remediation system of claim 7 wherein said passing direct current step is performed by passing current through at least one of said fire well, said vapor-extraction well and a conducting rod, in contact with said clay bearing layer and through at least one of said fire well, said vapor-extraction well and a conducting rod, in contact with said clay bearing layer.

9. The process for performing soil remediation system of claim 8 wherein the polarity of at least one of said fire well, said vapor-extraction well and a conducting rod changes with time.

10. A system for performing soil remediation comprising:
- a fire well extending below grade, having a first end, located nearer grade and provided with a gas-injection port near said first end, and a second end further from grade, having exit perforations near said second end;
- a burner in fluid communication with said fire well for transmitting combustion products through said fire well;
- a vapor-recovery well extending below grade, having a first end nearer grade and a second end further from grade, and having inlet perforations and having a withdrawal port;
- a fluid blower having a suction in communication with said withdrawal port and an outlet in fluid communication with said gas-injection port of said fire well.

11. The system of claim 10 further comprising:
- a pressurized source of fuel connected to said burner; and
- a pressurized source of air connected to said burner.

12. The system of claim 10 wherein said injection port is situated downstream of said burner.

13. The system of claim 10 further comprising means for monitoring the temperature and pressure of said system for performing soil remediation.

14. The system of claim 10 further comprising means, interposed between said withdrawal port of said vapor-extraction well and said suction of said fluid blower for removing liquids from said vapor-extraction well before reaching said suction of said fluid blower.

15. The system of claim 11 further comprising economizer means, connected to one of said said burner and said pressurized source of fuel, for reducing the flow of fuel from said pressurized source of fuel in response to the caloric content of vapors from said fluid blower.

* * * * *